United States Patent [19]
Ikegame

[11] Patent Number: 5,933,406
[45] Date of Patent: Aug. 3, 1999

[54] LINEAR GUIDE DEVICE

[75] Inventor: Tetsuo Ikegame, Hachioji, Japan

[73] Assignee: Olympus Optical Co., Ltd., Japan

[21] Appl. No.: 08/556,860

[22] Filed: Nov. 2, 1995

[30] Foreign Application Priority Data

Nov. 2, 1994 [JP] Japan ................................. 6-269728

[51] Int. Cl.⁶ .............................. G11B 21/02; G11B 7/08
[52] U.S. Cl. .......................................... 369/247; 369/219
[58] Field of Search ................................. 369/244, 246, 369/247, 248, 249, 215, 219, 223, 44.14, 44.15; 360/104, 105, 106, 107, 109

[56] References Cited

U.S. PATENT DOCUMENTS

| | | | |
|---|---|---|---|
| 4,788,677 | 11/1988 | Ikedo et al. | 369/249 |
| 5,063,548 | 11/1991 | Yamashita et al. | 369/44.14 |
| 5,150,343 | 9/1992 | Goto et al. | 369/44.14 |
| 5,375,115 | 12/1994 | Shimegi et al. | 369/244 |
| 5,615,204 | 3/1997 | Watanabe et al. | 369/247 |

FOREIGN PATENT DOCUMENTS

| | | | |
|---|---|---|---|
| 63-113874 | 5/1988 | Japan | 369/244 |
| 1-88925 | 4/1989 | Japan | 369/244 |
| 2-68723 | 3/1990 | Japan | 369/244 |
| 2-244431 | 9/1990 | Japan | 369/244 |
| 3-5972 | 1/1991 | Japan | 369/244 |
| 3-171480 | 7/1991 | Japan | |
| 3-268278 | 11/1991 | Japan | 369/244 |
| 5-145705 | 6/1993 | Japan | |
| 5-234094 | 9/1993 | Japan | |
| 6-169560 | 6/1994 | Japan | |
| 6-259895 | 9/1994 | Japan | |
| 6-309815 | 11/1994 | Japan | |
| 7-296575 | 11/1995 | Japan | |
| 8-129837 | 5/1996 | Japan | |

OTHER PUBLICATIONS

Patent Abstracts of Japan, 62–137775, Takewa et al, Jun. 20, 1987, "Floppy Disk Device", pp. 411–414.

*Primary Examiner*—David L. Ometz
*Attorney, Agent, or Firm*—Ostrolenk, Faber, Gerb & Soffen, LLP

[57] ABSTRACT

Holding parts are formed on a base just inside the parts fixing both ends of a guide rail on the base. The holding parts are provided with respective U-shaped channels which are so formed as to surround the guide rail with a space. A damping material is put between the guide rail and the channel and also, put in a wedge-shaped space surrounded by a receiving face, a mounting face and a D-cut part provided at each of both ends of a guide rail. The structure of the present invention enables reduction of the vibration conveyed from a recording/regenerating head to a chassis, securely fixing a guide rail and preventing lean of the optical axis of the recording/regenerating head.

20 Claims, 10 Drawing Sheets

LINEAR GUIDE DEVICE

BACKGROUND OF THE INVENTION

1. Field of The Invention

The present invention relates to a linear guide device for use in moving a head in a magneto-optical disk recording/regenerating device, a floppy disk drive FDD) and the like.

2. Discussion of Related Art

The following device as shown in FIGS. 16 to 18 is known as a linear guide device for use in moving a head in a magneto-optical disk recording/regenerating device, a floppy disk drive (FDD) and the like.

A motor 2 on which a disk-shaped recording medium D is placed and which engages an output shaft and rotates the recording medium D is disposed on a chassis 1. The chassis 1 is provided with a head traveling space 4 whose upper side is open. A pair of head guide members 5 arranged parallel to each other are provided between two ends of the head traveling space 4. The head guide members 5 are slidably fitted with a head 3. The head 3 is slidably guided substantially linearly along the head guide members 5.

Each of the head guide members 5 is shaped into a cylindrical form and is fitted in a metal bearing 3a provided in the head 3 to thereby slidably support the head 3. Referring to FIG. 18, each of both ends of each head guide member 5 is supported on a support step part 1a formed on the chassis 1 and is fixed in the state of being pressed against one side wall of the step part 1a by means of a leaf spring 7 secured to a bottom wall of the step part 1a by means of a screw 6.

However, the device of the above structure has the following problem.

That is, referring to FIGS. 16 and 18, an objective lens 8 for focusing laser beams on a given position of the recording medium D is disposed on an upper part of the head 3. This objective lens 8 is driven in the arrowed X- and Z-directions respectively parallel and perpendicular to the recording medium D by means of a voice coil, etc. when the recording medium D is rotated by means of the motor 2. The follow-up action of the objective lens 8 to the recording medium D is conducted up to a frequency as relatively high as 3 to 4 kHz, so that the objective lens 8 is generally vibrated at a high frequency.

However, the vibration reaction force of this objective lens 8 is conveyed via the head 3 to the head guide member 5 and further conveyed via the chassis 1 and the motor 2 to the recording medium D. The head guide member 5, chassis 1 and motor :2 are mainly composed of respective metal members, so that the vibration is conveyed with especially high accuracy. When the recording medium D is thus vibrated, the objective lens 8 tries to follow up the vibration of the recording medium D because of the need of focusing itself. What is known as the state of positive feedback is reached. At that time, the problem has been experienced that, for example, the additional disturbance of the natural frequencies of the recording medium D, motor 2 and head guide member 5 leads to immediate occurrence of an oscillating condition with the result that the control of the objective lens 8 is lost to thereby disenable the follow-up action to the recording medium D.

The following invention for solving the above problem was proposed in, for example, Japanese Patent Application Laid-Open Specification No. 281223/1992.

In the above invention, referring to FIG. 19, a rodlike head guide member 5 supporting a recording/regenerating head in a fashion enabling substantially linear movement of the recording/regenerating head is disposed on a chassis 1. A coupling part 10 is bonded to an end of a principal part 9 of the head guide member 5. A connecting part 10b is connected to the coupling part 10. A locking edge 10c secured to the chassis 1 by means of a screw 6 is connected to the connecting part 10b.

This connecting part 10b is formed from a thin plate resin or hard rubber or a metal plate spring and is characterized in that the natural frequency of the connecting part 10b along at least one direction there-of is lower than any of those of the above coupling part 10, principal part 9 and locking edge 10c.

In the device of the above structure, the vibration of the recording/regenerating head at the driving of a recording medium because of the follow-up action to the recording medium is accompanied by the conveyance of the vibration reaction force of the head to the principal part 9 of the head guide member 5. This vibration is effectively damped by the connecting part 10b whose natural frequency is low. Therefore, either the vibration is not conveyed to the recording medium at all or the conveyed vibration is negligible so that the occurrence of an oscillating condition can be suppressed.

However, the invention of Japanese Patent Application Laid-Open Specification No. 281223/1992 has the following drawbacks.

That is, each of both ends of the principal part 9 of the guide member is supported by, for example, the connecting part 10b which is composed of another material of low rigidity. Therefore, the construction of the locking part for the guide member is complex, so that the cost is increased.

Further, the low rigidity of the member fixing at each of both ends of the guide member causes instability. In the application of a vibrating force to the guide member by, for example, outside vibration or the moving of the recording/regenerating head, even if the vibrating force is very minute, the guide member is vibrated, so that the recording/regenerating head is shifted or leaned, thereby disenabling attainment of desirable servo and recording/regenerating characteristics.

SUMMARY OF THE INVENTION

It is an object of the present invention to reduce the conveyance of vibration from a recording/regenerating head to a chassis and to not only simplify the construction of a locking part provided to fix a guide member but also render the fixing of the guide member secure so as to block leaning of the optical axis of the recording/regenerating head.

The foregoing and other objects, features and advantages of the present invention will become apparent from the following detailed description and appended claims taken in connection with the accompanying drawings.

DETAILED DESCRIPTION OF THE INVENTION

Figure 1:
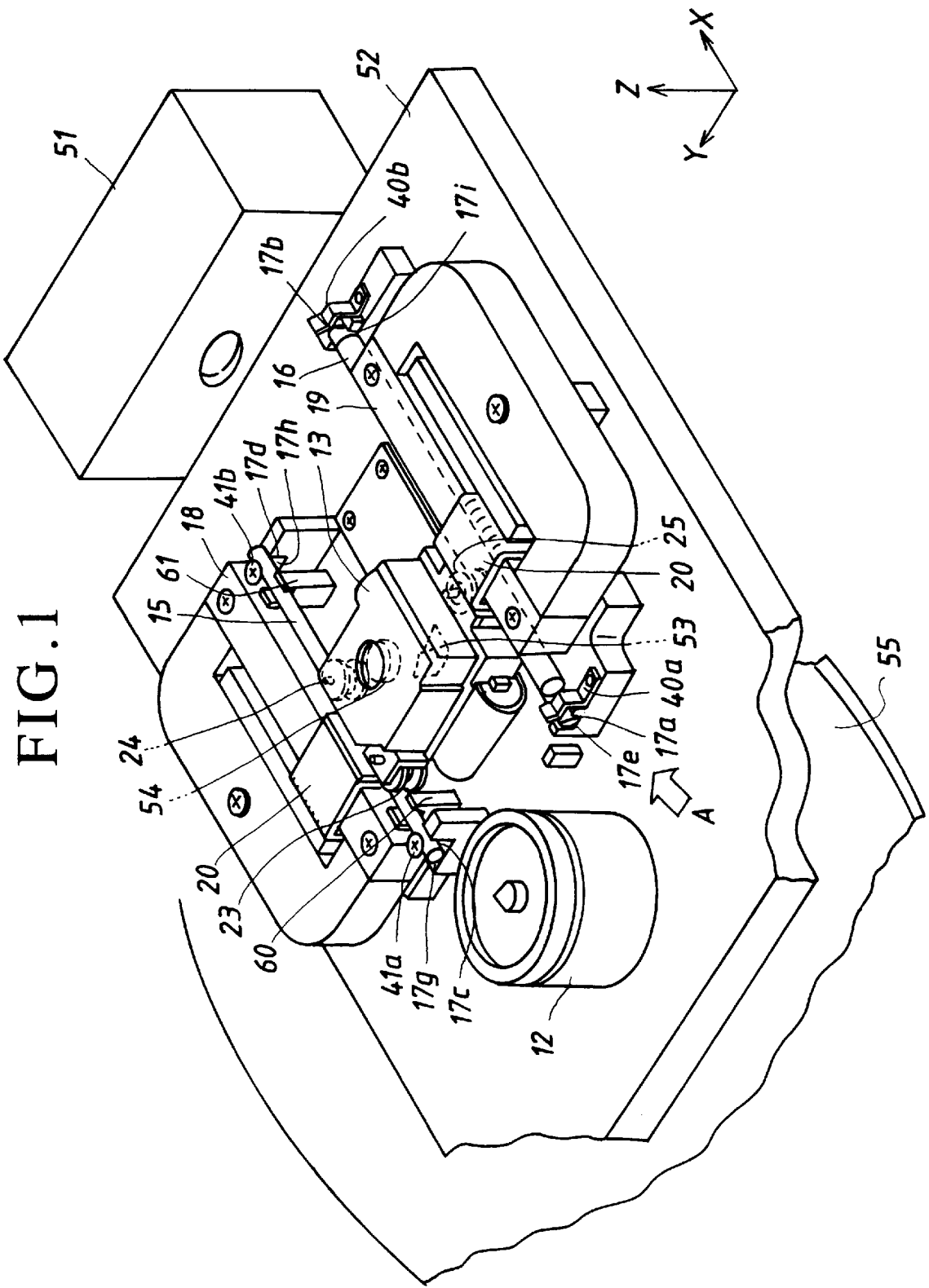
FIG. 1 is a perspective view given to illustrate Example 1.

According to the first aspect of the present invention, there is provided a linear guide device comprising an information recording medium, a movable part having at least part of a head adapted to record information on the information recording medium and/or regenerate information therefrom, a bearing integrally fixed on the movable part and a guide member fixed on a base and adapted to guide the bearing, wherein the guide member has its both ends fixed on the base and wherein a damping material is interposed between the two ends of the guide member and between the guide member and the base.

According to the second aspect of the present invention, there is provided a linear guide device comprising an information recording medium, a movable part having at least part of a head adapted to record information on the information recording medium and/or regenerate information therefrom, a bearing integrally fixed on the movable part and a guide member fixed on a base and adapted to guide the bearing, wherein the guide member is in the form of a hollow pipe in which a damping material is filled.

According to the third aspect of the present invention, there is provided a linear guide device comprising an information recording medium, a movable part having at least part of a head adapted to record information on the information recording medium and/or regenerate information therefrom, a bearing integrally fixed on the movable part and a guide member fixed on a base and adapted to guide the bearing, wherein the guide member is provided at its part excluding a guide part with a damping material.

According to the fourth aspect of the present invention, there is provided a linear guide device comprising an information recording medium, a movable part having at least part of a head adapted to record information on the information recording medium and/or regenerate information therefrom, a bearing integrally fixed on the movable part and a guide member fixed on a base and adapted to guide the bearing, wherein the guide member has at least one end positioned in two directions substantially perpendicular to each other and pressed against the base by means of a damping material to thereby fix the guide member.

According to the fifth aspect of the present invention, there is provided a linear guide device comprising an information recording medium, a movable part having at least part of a head adapted to record information on the information recording medium and/or regenerate information therefrom, a bearing integrally fixed on the movable part and a guide member fixed on a base and adapted to guide the bearing, wherein at least one end of the guide member is an integrally formed part of low rigidity whose tip is fixed on the base.

According to the sixth aspect of the present invention, there is provided a linear guide device comprising an information recording medium, a movable part having at least part of a head adapted to record information on the information recording medium and/or regenerate information therefrom, a bearing integrally fixed on the movable part and a guide member fixed on a base and adapted to guide the bearing, wherein the guide member has its both ends fixed on respective locking parts of the base, at least one of the locking parts having a rigidity lower than those of other parts of the base.

According to the seventh aspect of the present invention, there is provided a linear guide device comprising an information recording medium, a movable part having at least part of a head adapted to record information on the information recording medium and/or regenerate information therefrom, a bearing integrally fixed on the movable part and a guide member fixed on a base and adapted to guide the bearing, wherein the guide member has its both ends fixed on respective locking parts of the base and wherein the guide member contacts each locking part at a small length along the longitudinal direction of the guide member.

According to the eighth aspect of the present invention, there is provided a linear guide device comprising an information recording medium, a movable part having at least part of a head adapted to record information on the information recording medium and/or regenerate information therefrom, a bearing integrally fixed on the movable part and a guide member fixed on a base and adapted to guide the bearing, wherein the guide member has its one end, said one end being disposed on the side close to a motor for rotating the information recording medium, elastically fixed on the base and has the other end fixed on the base in a solid manner as compared with that effected at said one end.

In the linear guide device according to the first aspect of the present invention, the guide rail has its both ends fixed on the base and the damping material is interposed therebetween, so that not. only is the vibration of the guide rail suppressed but also the fixing of the guide rail on the base is secure. Therefore, excellent servo and recording/regenerating characteristics can be attained.

In the linear guide device according to the second aspect of the present invention, the guide rail is in the form of a hollow pipe in which the damping material is filled, so that the guide rail deforming vibration can be suppressed. Further, the surface area exposed to outside air of the damping material is so small that the problem is less likely to occur that gas evaporated from the damping material adheres to the surface of the optical element to thereby decrease light transmission therethrough.

In the linear guide device according-to the third aspect of the present invention, the guide-rail is so cut as to provide a cut part having a D-shaped section at its part excluding the guide part and the damping material is incorporated in the cut part, so that the guide rail deforming vibration can be suppressed.

In the linear guide device according to the fourth aspect of the present invention, the guide rail has at least one end positioned in two directions substantially perpendicular to each other and pressed against the base by means of the damping material, the position of the fixed guide rail is not shifted by a force not greater than the press force of the damping material. Further, the vibration is suppressed by the damping material.

In the linear guide device according to the fifth aspect of the present invention, at least one end of the guide rail has a part of rigidity lowered so as to enable elastic deformation integrally formed, so that not only is the construction simplified as compared with the attachment of another member but also the conveyance of vibration from the guide rail to the base can be minimized. Further, the resonance frequency of the guide rail can be lowered, so that excellent servo characteristics can be obtained.

In the linear guide device according to the sixth aspect of the present invention, the rigidity of each of the guide rail locking parts of the base is lowered so as to enable elastic deformation, so that not only is the construction simplified as compared with the attachment of another member but also the conveyance of vibration from the guide rail to the base can be minimized. Further, the resonance frequency of the guide rail can be lowered, so that excellent servo characteristics can be obtained.

In the linear guide device according to the seventh aspect of the present invention, the guide rail contacts each locking part at a small length along the longitudinal direction of the guide rail, so that the resonance frequency of the guide rail is lowered with the result that excellent servo characteristics can be obtained.

In the linear guide device according to the eighth aspect of the present invention, the guide rail has its one end close to a motor elastically fixed on the locking part and has the other end fixed on the locking part in a solid manner as compared with that effected at the one end, so that not only can the vibration of the guide rail which is readily conveyed to the motor be minimized but also the reliability of each of the guide rail locking parts can be ensured. Preferred

PREFERRED EMBODIMENT OF THE INVENTION

The present invention will now be described in greater detail with reference to the following Examples, which should not be construed as limiting the scope of the invention.

EXAMPLE 1

This Example will be described referring to FIGS. 1 to 7 in which FIG. 1 is a perspective view, FIG. 2 a sectional view of essential part, FIG. 3 a partial perspective view of guide member, FIG. 4 a sectional view of holding part, FIG. 5 a plan given to explain the state of vibration, FIG. 6 a side view of a modification and FIG. 7 a sectional view of a modification.

Referring to FIG. 1, a movable part 13 which can change its location is provided with bearings 23, 24, 25 which are adapted to support the movable part 13 in a manner such that its location can smoothly be changed and to restrict its direction of movement (hereinafter referred to simply as "bearings"). Cylindrical guide members 15, 16 (hereinafter referred to "guide rails") are adapted to restrict the direction of movement of the movable part 13 and to support the same. The guide rail 15 formed from stainless steel is positioned by mounting faces 17g, 17h and receiving faces 17c, 17d which are all disposed on a base 52 and pressed by means of screws 41a, 41b. Numeral 12 denotes a spindle motor adapted to mount thereon and rotate a magnetooptical disk 55 and fixed on the base 52.

Figure 2:
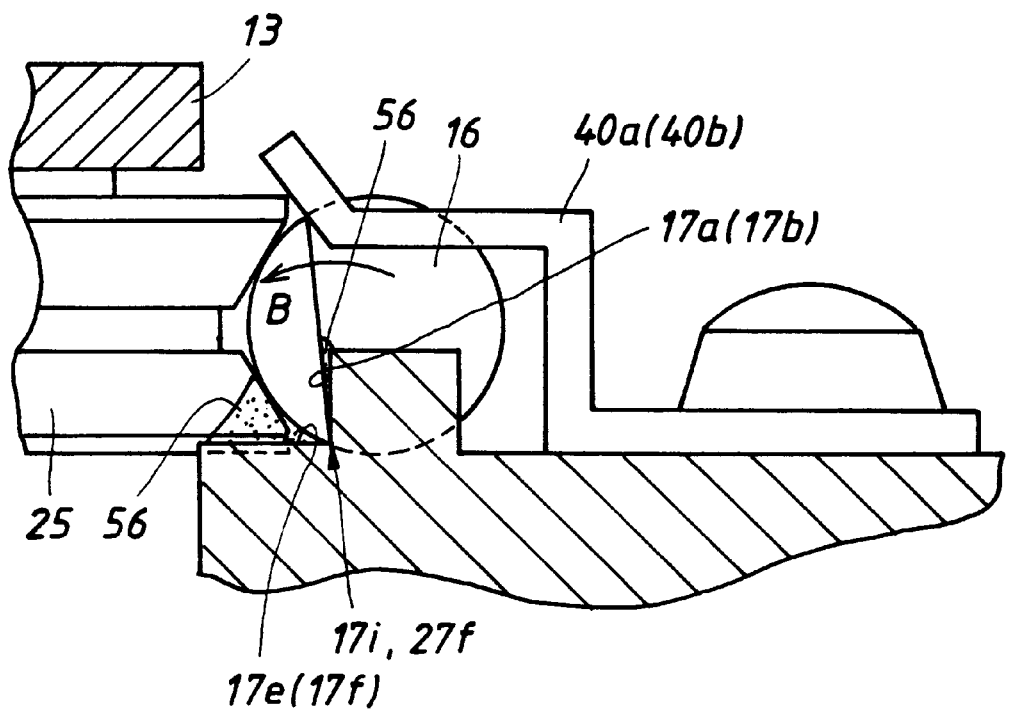
FIG. 2 is a sectional view of essential part given to illustrate Example 1.
Figure 3:
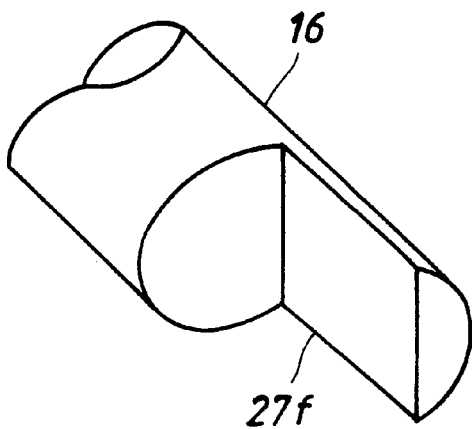
FIG. 3 is a partial perspective view given to illustrate Example 1.
Figure 4:
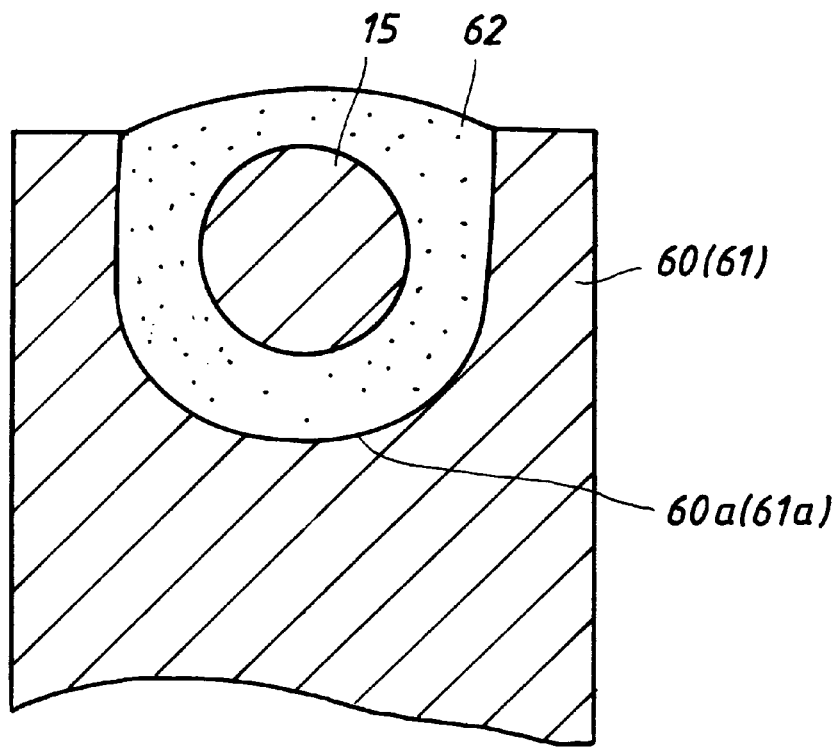
FIG. 4 is a sectional view given to illustrate Example 1.

On the other hand, referring to FIGS. 2 and 3, the stainless steel guide rail 16 is provided at its both ends and in the vicinity thereof with respective D-shaped cuts formed by shaving at least the radius so as to produce two substantially identical planes which make an acute angle with the cylinder surface of the guide rail. Each edge line 27f of the planes is attached to an edge line 17i formed by the mounting face 17e, 17f and receiving face 17a, 17b for the guide rail 16 and the guide rail 16 is urged in the direction urged by the bearing 25 so as to be rotatable about the edge line 27f by means of press springs 40a, 40b.

Although the edge line 17i is shown as forming an edge, chamfering may be effected in the form of a circular arc. This applies in the following Examples as well.

Numerals 18, 19 denote magnetic circuits, which cooperate with voice coils 20 to give a thrust for moving the movable part 13.

Light emitted from a fixed optical system 51 secured on the base 52 which is equipped with a laser, a photodetector, a prism, etc. has its optical path deflected upward by a mirror 53 disposed on the movable part 13 and is condensed by means of an objective lens 54. The resultant light spot is projected on the recording/regenerating surface of the magneto-optical disk 55 to thereby conduct recording/regeneraton of information.

The guide rail 16 urged by the press springs 40a, 40b is supported by the edge line 17i, so that the press force exerted by the press springs 40a, 40b is captured as a torque with the result that the guide rail 16 is rotated about the edge line 27f in the direction of the arrow B to thereby urge the bearing 25. The edge line 27f at each of two locations is so formed as to be substantially parallel to the cylinder surface of the guide rail 16, so that the then angle of rotation is identical at both ends of the guide rail 16. The guide rail 16 moves in substantially parallel relationship with the edge line 27f of the guide rail 16 to thereby impart pre-loads to the bearings 23, 24, 25 with the result that any backlash is removed.

Therefore, the movable part 13 can move in the radial direction of the magneto-optical disk 55 without any backlash by the rolling of the bearings 23, 24, 25 on the guide rails 15, 16.

Referring to FIG. 2, a damping material 56 being in the form of a liquid, grease or gel, for example, silicone grease or silicone oil is incorporated in a wedged space surrounded by the D-shaped cut part of each of both ends of the guide rail 16, the mounting face 17e, 17f and the receiving face 17a, 17b.

Thus, the position of the guide rail 16 relative to the base 52 is determined by the contact of the edge line 27f with the edge line 17i and further by the contact of the guide rail 16 with the bearing 25.

At the occurrence of vibration of the guide rail 16 with respect to the base 52 by the vibration of the guide rail 16 itself and the like, the damping material 56 suppresses the vibration.

A holding part 60, 61 is formed on the base 52 around inside a locking part of the base 52 at each of both ends of the guide rail 15. The holding part 60, 61 is provided with a U-shaped channel 60a, 61a, which is formed so as to surround the guide rail 15 with a space. A damping material 62 such as silicone grease, silicone oil, a butyl adhesive or an acrylic gel is incorporated between the guide rail 15 and the channel 60a, 61a, which is occasionally one already cured (see FIG. 4).

The holding part 60, 61 is disposed in a position such that it does not interfere with, the movement of the movable part 13 along the radial direction of the magneto-optical disk 55.

Both ends of the guide rail 15 are firmly fixed on the base 52 by means of the screws 41a, 41b. When the guide rail 15 is vibrated and, for example, suffers from primary transverse vibration, the middle of the guide rail 15 is extensively vibrated as shown in FIG. 5. However, the damping material 62 is positioned inside the locking parts provided at both ends of the guide rail 15, so that the amplitude of that part of the guide rail 15 is greater than those of the locking parts to thereby enable effective suppression of the vibration.

In this Example, the vibrations of the guide rails 15, 16 are suppressed by the damping material provided inside both ends thereof with the result that the vibrations are not conveyed to the base 52 to thereby enable obtaining excellent servo performance. Further, both ends of the guide rail 15 are firmly fixed with the screws while both ends of the guide rail 16 are weakly fixed with the springs. That is, the two guide rails 15, 16 are fixed in different manners, so that the guide rails 15, 16 have frequencies of identical vibration mode which are different from each other. Therefore, the energy conveyed to the motor 12 and the movement of the movable part 13 attributed to the resonance of the guide rails 15, 16 are minimized to thereby enable obtaining further improved servo performance.

Modified Example 1-1

Figure 6:
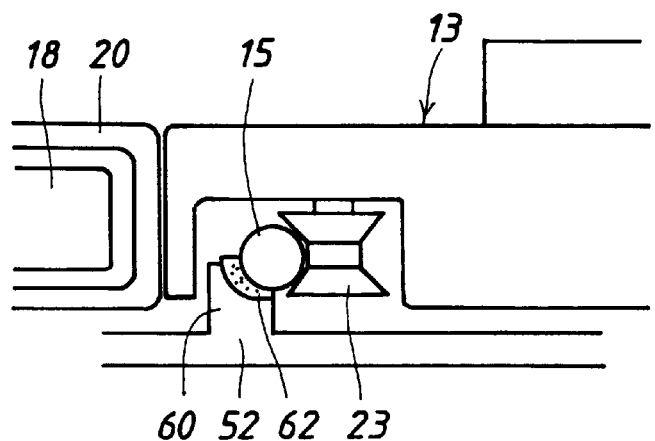
FIG. 6 is a side view given to illustrate a modification of Example 1.
Figure 7:
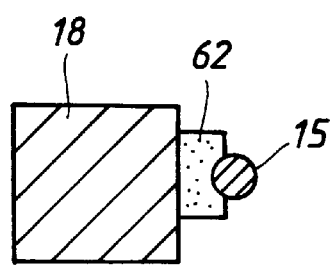
FIG. 7 is a sectional view given to illustrate a modification of Example 1.

If the construction is such that no part of the movable part 13 is interposed between the guide rail 15 and the base 52 as shown in FIG. 6, the holding member 60 does not interfere with the movable part 13, so that the entire end to end length of the guide rail 15 can be provided with the holding member 60 whose entire length can be provided with the damping material 62.

In this construction, the damping material 62 can be applied to all portions of the guide rail 15 including the middle thereof where the amplitude of the vibration is extensive and further the vibration of the guide rail 15 can be suppressed.

Modified Example 1-2

The damping material 62 can attain desired effect as long as it is interposed between the guide rail 15 and the locking part integrally provided on the base 52. For example, it is satisfactory to interpose the damping material 62 such as a rubber sheet between a yoke of the magnetic circuit 18 and the guide rail 15 as shown in FIG. 7.

Modified Example 1-3

Although the damping material 52 has been provided inside both ends of the guide rail 15, 16 in Example 1, it is satisfactory to provide the damping material 62 inside only either of both ends of the guide rail 15, 16. When the damping material 62 is provided inside only one of the ends, it is preferred that the end near the motor 12 be chosen. The reason is that the energy conveyed from the end of the guide rail 15 which is close to the motor 12 is greater at the time of conveyance of vibration from the guide rail 15 via the base 52 to the motor 12.

Modified Example 1-4

Although both the guide rails 15, 16 have been composed of stainless steel in Example 1, they may be composed of different materials. For example, it is feasible to form the guide rail 15 from a ceramic such as silicon carbide while forming the guide rail 16 from stainless steel. The ceramic has a higher Young's modulus and lower specific gravity than stainless steel, so that the resonance frequency of the guide rail 15 is higher than that of the guide rail 16 to thereby cause a frequency difference. Thus, the guide rail 15 and the guide rail 16 do not exhibit simultaneous vibration, so that excellent servo performance can be obtained.

Modified Example 1-5

A sliding bearing is employed for the guide support of the movable part 13 in place of the three bearings used in Example 1.

EXAMPLE 2

Figure 8:
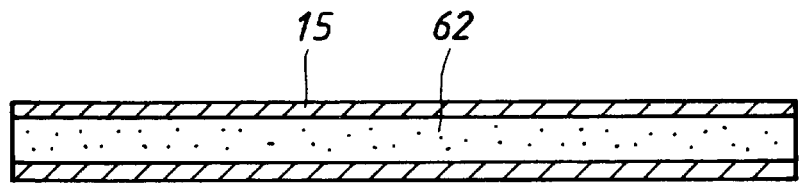
FIG. 8 is a sectional view given to illustrate Example 2.

FIG. 8 is a sectional view given to illustrate this Example.

Only the differences from Example 1 will be described in this Example. The drawings given in Example 1 will be referred to and the same numeral will be assigned to the same constituent part with the description omitted.

In this Example, the guide rail 15 has the form of a hollow pipe in which the damping material 62 is filled.

In this Example, the vibration which causes deformation of the guide rail 15 can be suppressed.

In this Example, no other parts than the guide rail 15 have to change the shapes, so that it is easy to carry out this embodiment. Further, the surface area exposed to outside air of the damping material 62 is so small that gas evaporation is blocked with the result that the problem is less likely to occur that gas evaporated from the damping material 62 adheres to the surface of the optical element such as the objective lens 54 to thereby decrease light transmission therethrough. Sealing of both ends of the guide rail 15 leads to further improved effects.

EXAMPLE 3

Figure 9:
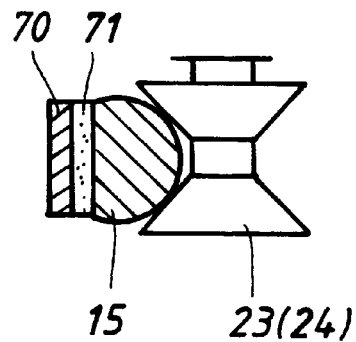
FIG. 9 is a sectional view given to illustrate Example 3.

FIG. 9 is a sectional view given to illustrate this Example.

The differences from Example 1 will be described in this Example. The drawings given in Example 1 will be referred to and the same numeral will be assigned to the same constituent part with the description omitted.

In this Example, the guide rail 15 is so cut as to provide a cut part having a D-shaped section at its part excluding the guide part brought into contact with the bearing 23, 24. The damping material 71 such as an acrylic polymer damping tape having a thin arresting plate 70 of stainless steel or the like attached thereto is bonded to the flat section of the D-shaped cut part. The bonding of the damping material 71 is effected on the entire length of the guide rail 15 or only part thereof.

In this Example, the vibration which causes deformation of the guide rail 15 can be suppressed. Further, the bonding of the damping material 71 to the guide rail 15 at its part excluding the guide part ensures freedom from becoming a hindrance.

In place of effecting the cutting to provide a cut part having a D-shaped section to thereby form a flat section capable of facilitating the bonding of the damping material 71, in this Example, the damping material 71 can be directly bonded to the cylinder surface of the guide rail 15 at its part excluding the guide part.

EXAMPLE 4

Figure 10:
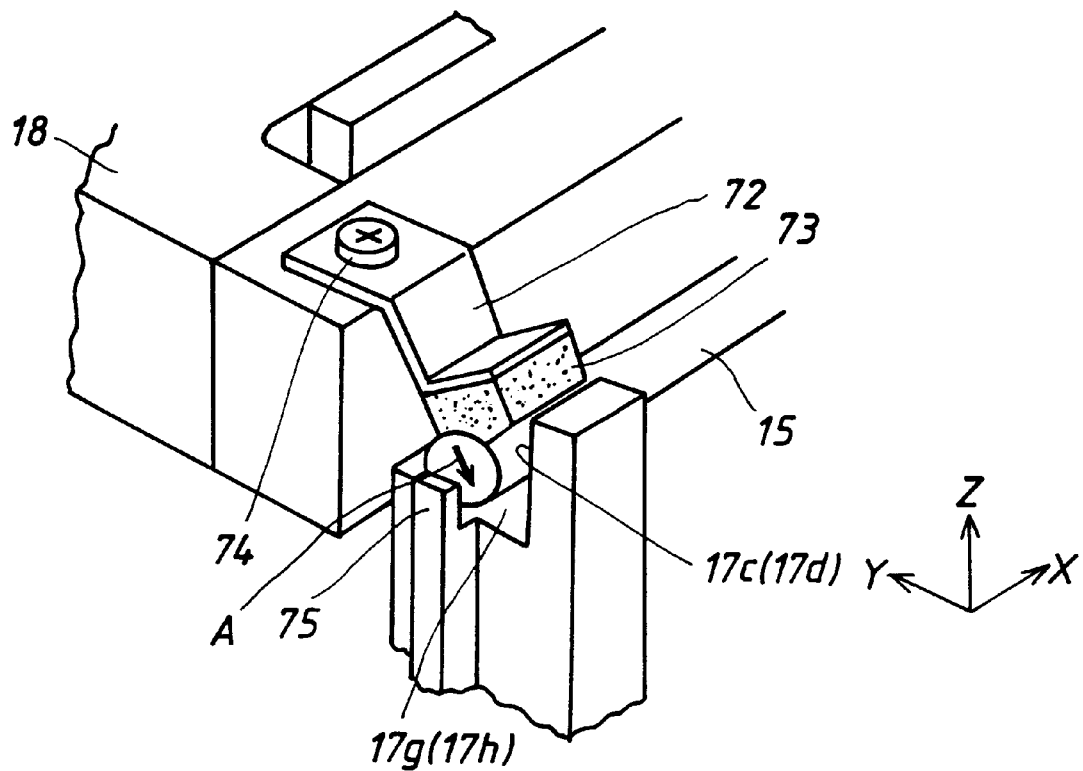
FIG. 10 is a perspective view given to illustrate Example 4.
Figure 11:
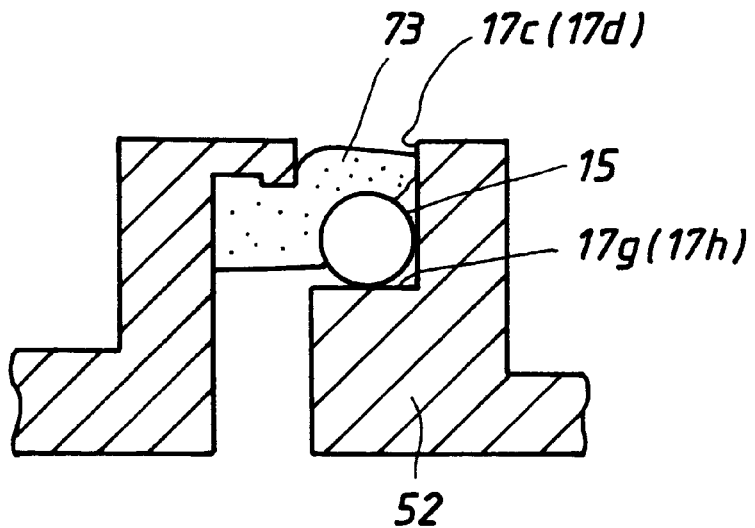
FIG. 11 is a sectional view given to illustrate a modification of Example 4.

FIGS. 10 and 11 are given to illustrate this Example, in which FIG. 10 is a perspective view and FIG. 11 a sectional view showing a modification.

Only differences from Example 1 will be described in this Example. Drawings given in Example 1 will be referred to and the same numeral will be assigned to the same constituent part with the description omitted.

Each of both ends of the guide rail 15 is pressed via a damping material 73 such as butyl rubber aslant downward in the direction of the arrow A of FIG. 10 against the receiving face 17c, 17d and the mounting face 17g, 17h of the locking part by means of a spring 72. The spring 72 is fixed on the yoke of the magnetic circuit 18 by means of a screw 74 for fixing the yoke on the base 52.

The power exerted by the spring 72 to press the guide rail 15 is set at one with which the movable part 13 is not displaced by outside vibration-at the time of recording/ regeneration of information on the magneto-optical disk 55, i.e., at the time of operation.

For example, provided that the total mass of the guide rails 15, 16 and the movable part 13 is 10 g, that the total power exerted by the press springs 40a, 40b to urge the guide rail 16 is 100 gf and that the maximum outside vibration is 5 G, the power F exerted by the springs 72 on both sides to press the guide rail 15 is so set as to satisfy the relationship:

$$F > 10 \ g \times 5 \ G + 100 \ gf = 150 \ gf.$$

(Each of the above terms represents a component along the Y-direction. With respect to a component along the Z-direction, the required power F is reduced by a decrease of the mass of the guide rail 16, etc. For example, F is set at 300 gf.)

By virtue of the above setting of the power, the guide rail 15 does not come apart from the receiving face 17c, 17d and the mounting face 17g, 17h of the locking part even when the vibration is applied thereto from outside at the time of operation. That is, the movable part 13 is free from undesirable displacement and lean.

Nevertheless, both the ends of the guide rail 15 are pressed by means of the damping material 73, so that the resonance and other vibration can be suppressed on the guide rail 15.

Further, the guide rail 15 is pressed via the damping material 73 by means of the spring 72, so that, even when the compression set of the damping material 73 is increased by the aging or the like, the press onto the guide rail 15 is satisfactory as long as the set is within the flex of the spring 72. Therefore, the reliability is improved.

Still further, a stopper 75 is formed on the base 52 as means for preventing the slip of the guide rail 15 along the axial direction (X-direction). Thus, the guide rail 15 does not slip along the axial direction even when the coefficient of friction between the guide rail 15 and the damping material 73 is low.

Modified Example 3-1

In the construction as defined in Modified Example 1-1 (see FIG. 6), the middle or the entire end to end length of the guide rail 15 is pressed via the similar damping material by the spring instead of the press of both the ends of the guide rail 15 carried out via the damping material 73 by the spring 72 in Example 3.

Modified Example 3-2

Although the press via the damping material 73 by the spring 72 has been carried out at both ends of the guide rail 15 in Example 3, it is satisfactory to effect the press via the damping material 73 by the spring 72 at only one of both ends of the guide rail 15. Preferably, only the end near the motor 12 is pressed via the damping material 73 by the spring 72 while the end remote from the motor 12 is directly fixed by a flat countersunk head screw.

Modified Example 3-3

Although the guide rail 15 has been pressed via the damping material 73 by the spring 72 in Example 3, it is satisfactory to effect the construction as shown in FIG. 11 in which the spring 72 is removed with the guide rail 15 being directly urged by the damping material 73 only.

Modified Example 3-4

Although the guide rail 15 has been pressed via the damping material 73 by the spring 72 in Example 3, the similar effect is obtained by removing the damping material 73 and instead by directly urging the guide rail 15 by a screw 72 formed from a plastic with excellent damping properties such as a liquid crystal polymer or a polyurethane plastic.

EXAMPLE 5

Figure 12:
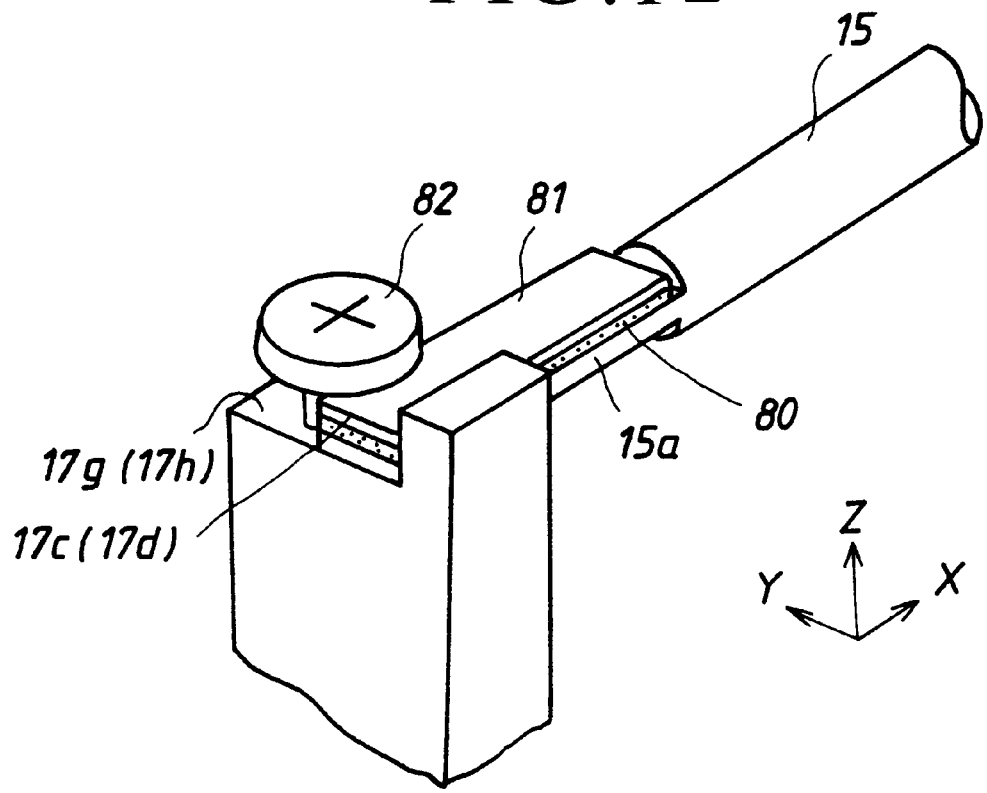
FIG. 12 is a perspective view given to illustrate Example 5.

FIG. 12 is a perspective view given to illustrate this Example.

Only differences from Example 1 will be described in this Example. Drawings given in Example 1 will be referred to and the same numeral will be assigned to the same constituent part with the description omitted.

The guide rail 15 is cut at its both ends and in the vicinity thereof on both upper and lower sides of the guide rail 15 so as to form a thin part 15a. A damping sheet 80 is bonded to the upper surface of the thin part 15a and a thin arresting plate of stainless steel or the like 81 is bonded to the upper surface thereof. The lower surface of the thin part 15a of the guide rail 15 is brought into contact with the mounting face 17g, 17h of the locking part and fixed by means of a screw 82 applied from the top of the arresting plate 81.

Figure 5:
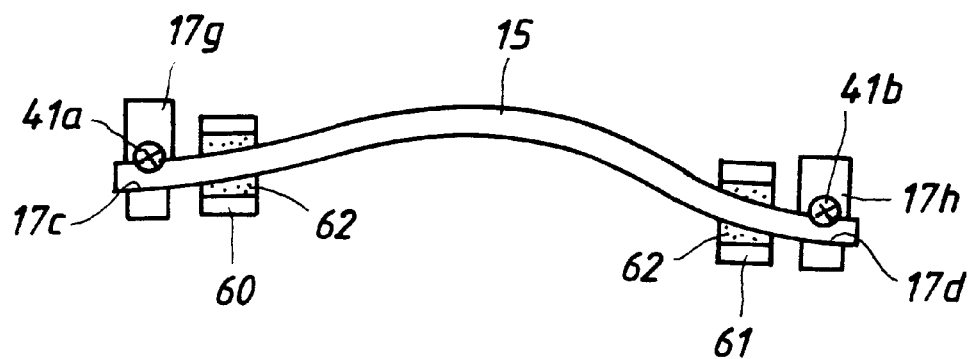
FIG. 5 is a plan given to illustrate Example 1.

The thus effected lowering of the rigidity of the guide rail 15 at its both ends and in the vicinity thereof lowers the resonance frequency of, for example, primary transverse vibration mode of the guide rail 15 as shown in FIG. 5.

In the magneto-optical disk recording/regenerating apparatus, generally, the focusing servo or tracking servo cutoff frequency is set at about 2 to 5 kHz.

In contrast, the primary transverse vibration resonance frequency of the guide rail 15 as shown in FIG. 1 is often about 1 to 3 kHz. When this resonance frequency is close to the focusing servo or tracking servo cutoff frequency, the resonance point gain is close to 0 dB, so that oscillation is likely to occur.

In the construction of this Example, the resonance frequency of the guide rail 15 can be reduced to thereby become lower than the cutoff frequency. Therefore, the resonance point gain can be increased with the result that oscillation no longer occurs. For example, the resonance frequency of the guide rail 15 is set at ½ of the cutoff frequency or below. Further, the damping sheet 80 provided with the arresting plate 81 is bonded in this Example, so that further suppression of the resonance can be achieved.

The construction of this Example created by cutting the guide rail 15 at its both ends and in the vicinity thereof on both upper and lower sides of the guide rail 15 so as to lower the rigidity is simpler than that obtained by mounting another spring member or the like. Further rigidity lowering can be achieved by making a slit in the center of the cuide rail 15. The positioning accuracy of the guide rail 15 on the base 52 is excellent because the lower surface of the thin part 15a of the guide rail 15 is directly brought into contact with the base 52 to thereby fix the guide rail 15.

In the above Example 4 as well, the both-end fixing conditions are changed from the state of both-end fixing to the state of nearly both-end pin support as compared with the fixing of guide rail 15 performed in Example 1 by virtue of the lowering of the rigidity of the locking part for the guide rail 15 (lowering of press force). Therefore, the resonance frequency of the guide rail 15 together with the movable part 13 is decreased with the result that stable servo performance is obtained for the above-mentioned reason.

EXAMPLE 6

Figure 13:
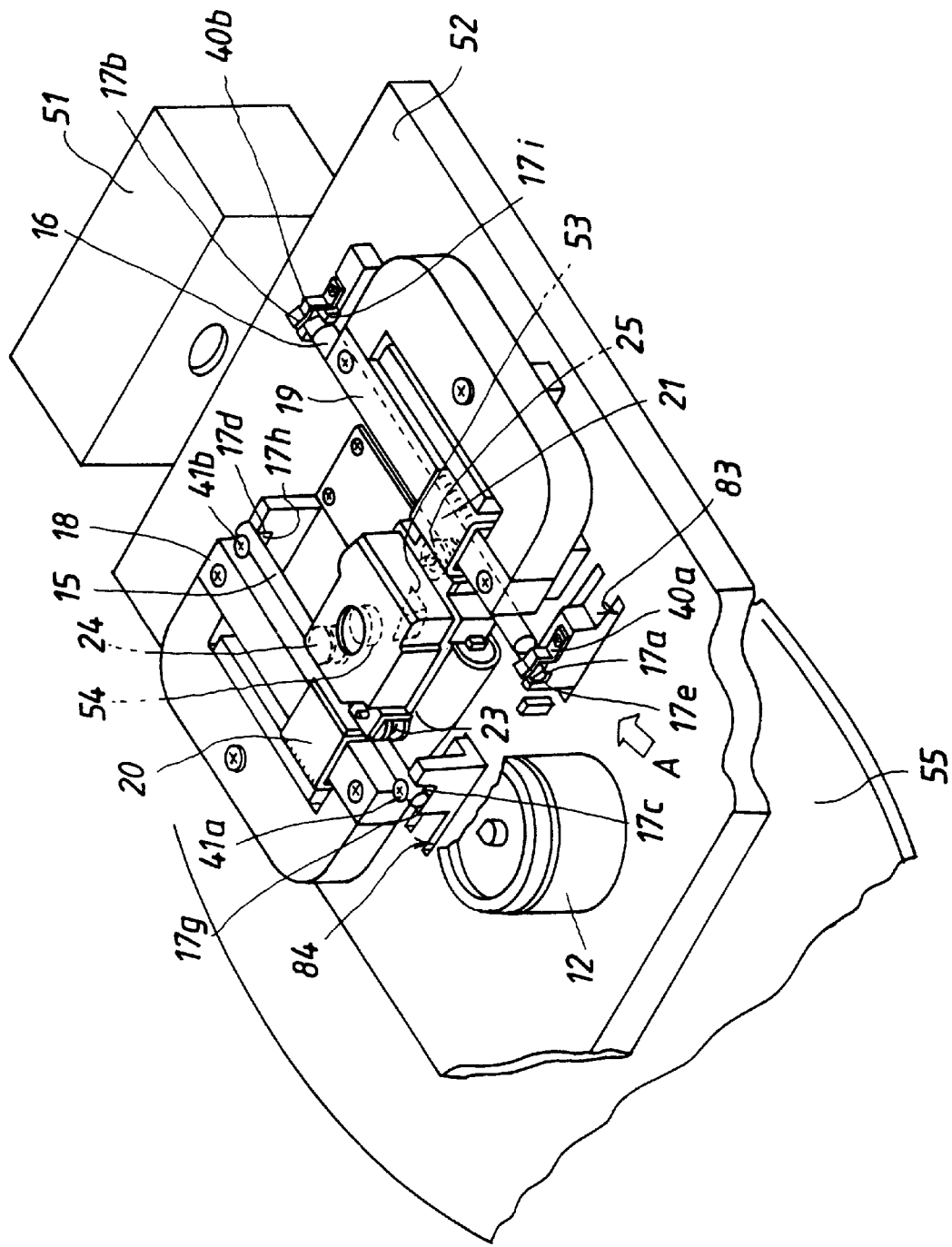
FIG. 13 is a perspective view given to illustrate Example 6.

FIG. 13 is a perspective view given to illustrate this Example.

Only differences from Example 1 will be described in this Example. Drawings given in Example 1 will be referred to and the same numeral will be assigned to the same constituent part with the description omitted.

A ]-shaped slit 83, 84 is formed on the base 52 around the locking part for guide rail 15, 16 arranged on the side of the motor 12. The guide rail 15, 16 is fixed by being urged against the mounting face 17e, 17f, 17g, 17h and the receiving face 17a, 17b, 17c, 17d of the locking part as in Example 1.

The locking part has a low rigidity so as to fall in the state of a cantilever spring by virtue of the formation of the ]-shaped slit 83, 84 around the locking part for guide rail 15, 16 arranged on the side of the motor 12. Thus, the resonance frequency of the guide rail 15, 16 is decreased with the result that stable servo performance is obtained for the same reason as in Example 5.

In this Example, cost increase is avoided because a guide rail locking part of low rigidity has integrally been formed on the base.

Further stabilized servo performance is obtained by forming the base from a plastic with excellent damping properties such as a liquid crystal polymer.

Modified Example 6-1

Although the ]-shaped slit 83, 84 has been formed on the base 52 around the locking part arranged on the side of the motor 12, in this Example, it is satisfactory to form ]-shaped slits on the base 52 around the locking parts arranged at both ends of the guide rail 15, 16.

Modified Example 6-2

Further stabilized servo performance is obtained by disposing a damping material on the base around or in the ]-shaped slit arranged around the locking part.

EXAMPLE 7

Figure 14:
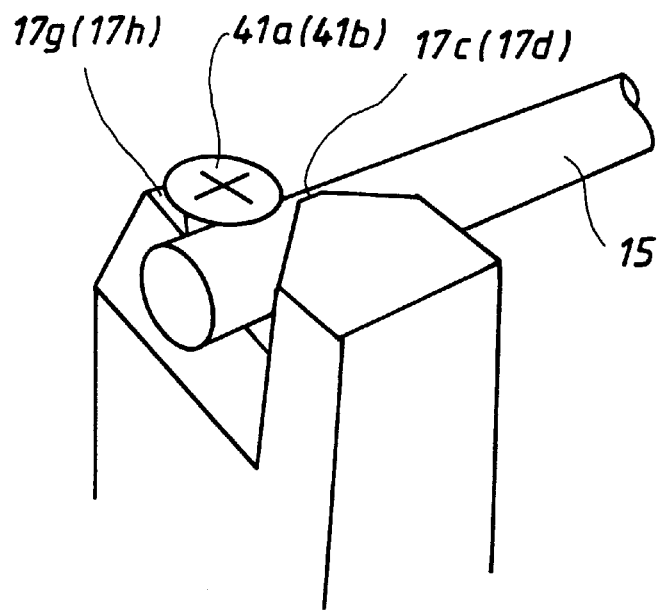
FIG. 14 is a perspective view given to illustrate Example 7.
Figure 15:
FIGS. 15(a) and (b) are explanatory views given to illustrate Example 7.
Figure 15:
Figure 16:
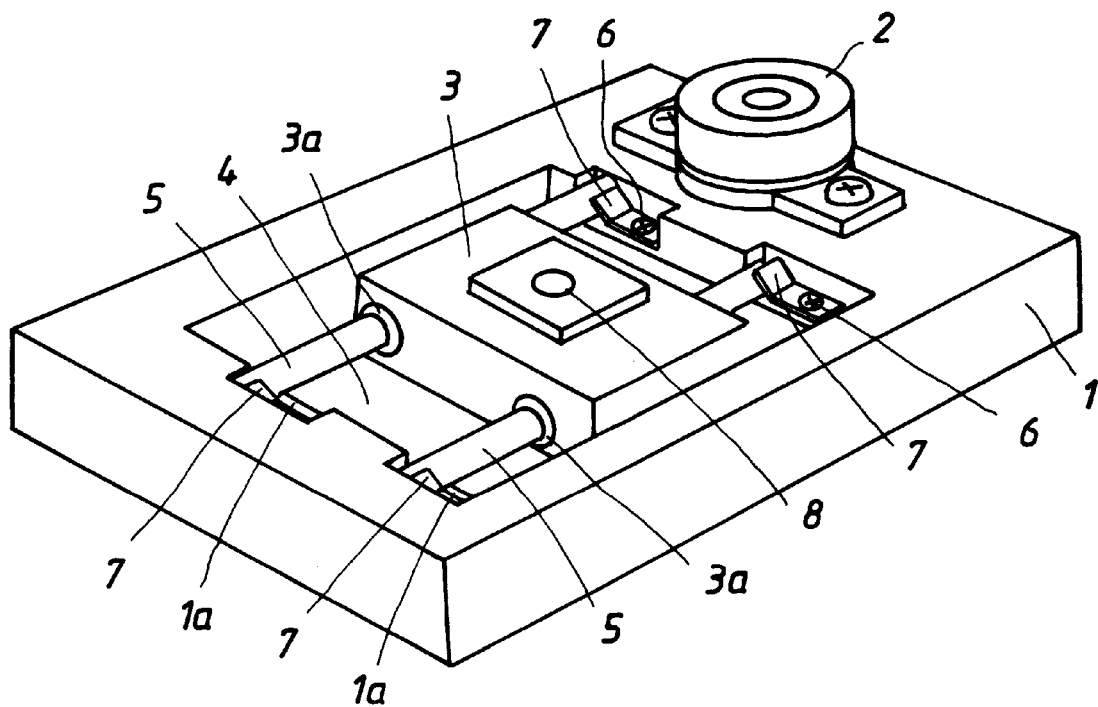
FIG. 16 is a perspective view given to illustrate a form of the prior art.
Figure 17:
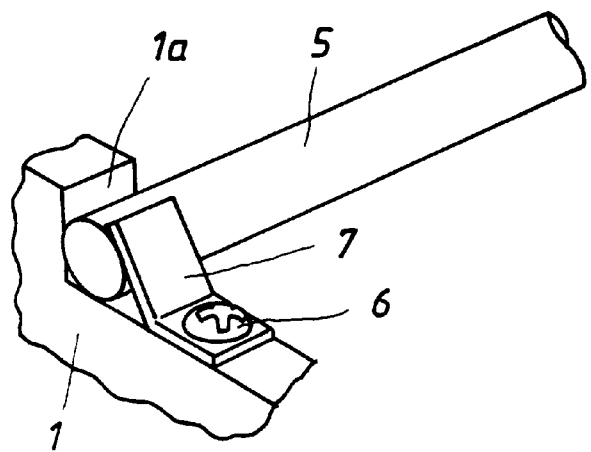
FIG. 17 is a partial perspective view given to illustrate a form of the prior art.
Figure 18:
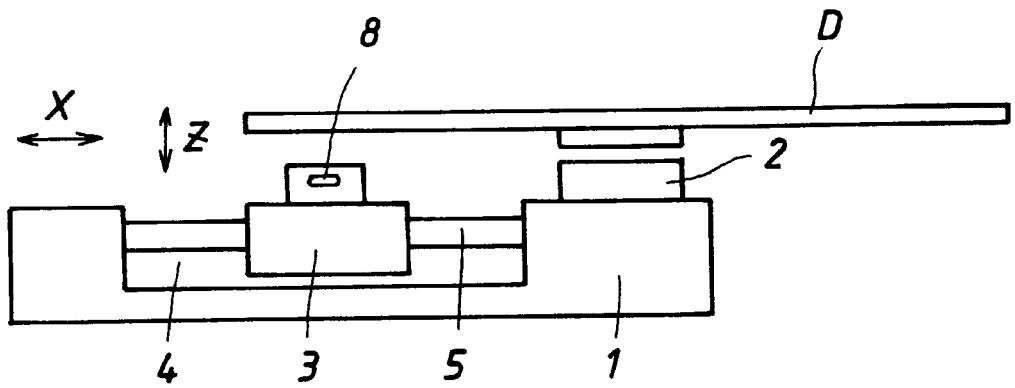
FIG. 18 is a side view given to illustrate a form of the prior art.
Figure 19:
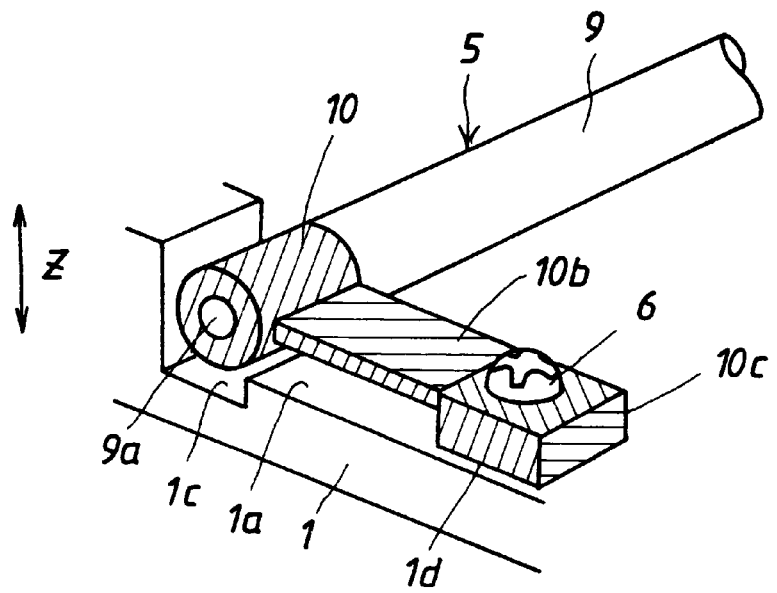
FIG. 19 is a perspective view given to illustrate another form of the prior art.

FIGS. 14 and 15(a) and (b) are given to illustrate this Example, in which FIG. 14 is a perspective view and FIG. 15(a) and (b) are explanatory views for vibration modes.

Only differences from Example 1 will be described in this Example. Drawings given in Example 1 will be referred to and the same numeral will be assigned to the same constituent part with the description omitted.

Each of the receiving face 17c, 17d and the mounting face 17g, 17h of the locking part provided for fixing the guide rail 15 is chamfered to thereby obtain a trapezoidal form, so that the axial length of contact with the guide rail 15 is minimized. For example, the length in which the guide rail 15 contacts each of the receiving face 17c, 17d and the mounting face 17g, 17h of the locking part is caused to be 1 mm or less. Further, the guide rail 15 is fixed by a point contact with the use of a flat countersunk head screw 41a, 41b.

The above construction of this Example nearly exhibits the mode of both-end pin support vibration as shown in FIG. 15(b) although the both-end fixing vibration mode as shown in FIG. 15(a) is exhibited when the mounting face 17g, 17h of the locking part is long as in Example 1. Accordingly, the resonance frequency of the guide rail 15 together with the movable part 13 is reduced.

In this Example, the locking part provided to fix the guide rail 15 has a high rigidity, so that excellent reliability is obtained.

Modified Example 7-1

Each of the receiving face 17c, 17d and the mounting face 17g, 17h of the locking part provided for fixing the guide rail 15 is shaped into a cylindrical form although each of the receiving face 17c, 17d and the mounting face 17g, 17h of the locking part has been shaped into a trapezoidal form in Example 1. The thus effected point contact of the guide rail 15 with each of the receiving face 17c, 17d and the mounting face 17g, 17h of the locking part leads to further lowering of the resonance frequency.

What is claimed is:

1. A linear guide device comprising:
   a base;
   a movable part including at least part of a head for reading or recording information on an information recording medium and a bearing operatively coupled to the movable part;
   a guide member having first and second portions rigidly coupled to the base, the guide member engaging and guiding the bearing; and
   a damping material coupled to the guide member and spaced away from and interposed between the first and second portions for coupling the guide member to the base and for changing at least one of the amplitude, frequency and mode of vibration of the guide member.

2. The linear guide device of claim 1, wherein the guide member includes a bearing engaging surface portion and a non-bearing engaging surface portion, and the damping material engages the non-bearing engaging surface portion.

3. The linear guide device of claim 2, further comprising a holding part disposed between the first and second portions of the guide member, the holding part being rigidly fixed to the base, the damping material coupling the guide member to the holding part.

4. The linear guide device of claim 3, wherein the holding part is located at a substantially central position between the first and second portions of the guide member.

5. The linear guide device of claim 3, wherein the holding part includes a U-shaped channel for receiving the guide member, the damping material filling the U-shaped channel and engaging the guide member.

6. The linear guide device of claim 3, wherein the holding part is substantially the same length as the guide member.

7. The linear guide device of claim 2, further comprising a plurality of holding parts each coupling the guide member to the base.

8. The linear guide device of claim 7, wherein one of said holding parts is located substantially near the first portion of the guide member and another of said holding parts is located near the second portion of the guide member.

9. The linear guide device of claim 2, further comprising first and second locking parts for fixing the respective first and second portions of the guide member to the base.

10. The linear guide device of claim 9, wherein the first and second locking parts include screws which engage the guide member and fix the guide member to the base.

11. The linear guide device of claim 9, wherein the first and second locking parts include a receiving face and a mounting face, the receiving and mounting faces lying in different planes and engaging the guide member.

12. The linear guide device of claim 11, wherein the receiving face and the mounting face are substantially perpendicular to one another.

13. The linear guide device of claim 11, wherein the receiving and mounting faces are tapered such that a relatively small area of each surface contacts the guide member.

14. The linear guide device of claim 13, wherein the surface area has a longitudinal dimension of about 1 mm or less.

15. The linear guide device of claim 11, wherein the receiving and mounting faces are curved such that each surface contacts the guide member at substantially one point.

16. The linear guide device of claim 1, wherein both of said first and second portions of the guide member are rigidly fixed on respective locking parts of the base, the guide member contacting each locking part along a small longitudinal length of the guide member.

17. The linear guide device according to claim 1, wherein the damping material is taken from the group consisting of grease, oil, adhesive and gel.

18. The linear guide device according to claim 1, wherein the damping material is disposed substantially at a central position between the first and second portions of the guide member.

19. The linear guide device of claim 1 further comprising:
   first and second locking parts formed on the base, each locking part including a mounting face and a receiving face, the faces lying in different planes and joining along an edge line;
   the guide member including a corresponding edge line for pivotal engagement with the edge lines of the locking parts, the bearing urging the guide member to pivot in one direction; and
   a press spring coupled to the base and engaging the guide member, the press spring urging the guide member to pivot in an opposite direction such that the guide member is biased against the bearing.

20. The linear guide device of claim 19, wherein the damping material is disposed between the guide member and the receiving and mounting faces.

* * * * *